United States Patent
Lim

(10) Patent No.: US 8,091,113 B2
(45) Date of Patent: Jan. 3, 2012

(54) SIMULTANEOUSLY REPRODUCING BROADCAST AND REPLAY CONTENT ON A DISPLAY

(75) Inventor: Yoen Lae Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 531 days.

(21) Appl. No.: 11/929,202

(22) Filed: Oct. 30, 2007

(65) Prior Publication Data

US 2008/0104658 A1    May 1, 2008

(30) Foreign Application Priority Data

Oct. 30, 2006   (KR) ........................ 10-2006-0105465

(51) Int. Cl.
    *H04N 7/16* (2006.01)
    *H04N 5/45* (2006.01)
    *H04N 5/783* (2006.01)
(52) U.S. Cl. .................... 725/142; 348/565; 386/350
(58) Field of Classification Search .................. None
    See application file for complete search history.

(56) References Cited

U.S. PATENT DOCUMENTS

| | | | |
|---|---|---|---|
| 5,621,473 A * | 4/1997 | Hill | 348/559 |
| 6,204,886 B1 | 3/2001 | Yoshimura et al. | |
| 6,601,237 B1 | 7/2003 | Ten Kate et al. | |
| 6,636,271 B1 | 10/2003 | Megeid | |
| 7,293,280 B1 * | 11/2007 | Gupta et al. | 725/139 |
| 2001/0049778 A1 * | 12/2001 | Van Der Vleuten et al. | 711/170 |
| 2002/0136528 A1 * | 9/2002 | Dagtas | 386/46 |
| 2002/0191958 A1 * | 12/2002 | Lin et al. | 386/68 |
| 2003/0208771 A1 * | 11/2003 | Hensgen et al. | 725/100 |
| 2003/0233666 A1 | 12/2003 | Onomatsu et al. | |
| 2004/0066396 A1 * | 4/2004 | Hatakenaka | 345/716 |
| 2004/0237109 A1 * | 11/2004 | Laitinen et al. | 725/62 |
| 2004/0268397 A1 * | 12/2004 | Dunbar et al. | 725/88 |
| 2006/0059426 A1 * | 3/2006 | Ogikubo | 715/723 |
| 2006/0245736 A1 * | 11/2006 | Affaki | 386/109 |
| 2006/0291817 A1 * | 12/2006 | Mughal et al. | 386/112 |
| 2008/0138029 A1 * | 6/2008 | Xu et al. | 386/46 |

FOREIGN PATENT DOCUMENTS

| | | |
|---|---|---|
| EP | 1173015 | 1/2002 |
| EP | 1255404 | 11/2002 |
| EP | 1465417 | 10/2004 |
| JP | 2004-072782 | 3/2004 |
| KR | 1020000003681 | 1/2000 |
| KR | 1020040086916 | 10/2004 |
| WO | 01/11865 | 2/2001 |

* cited by examiner

*Primary Examiner* — Andrew Koenig
*Assistant Examiner* — Jason J Chung
(74) *Attorney, Agent, or Firm* — Lee, Hong, Degerman, Kang & Waimey

(57) ABSTRACT

A media reproducing apparatus includes a receiving unit for receiving primary content, memory for storing replay content from an identified portion of the primary content for time-shifted display of the primary content, and a control unit. The control unit is configured to cause a display to display at a first display rate the primary content on a first region of a display, and further cause the display to display the replay content at a second display rate, which is different than the first display rates on a second region of the display. The replay content being displayed simultaneously with the primary content. The control unit is further configured to terminate the display of the replay content upon an occurrence of a timing event. The terminating operation causes the primary content to be displayed on both the first region and the second region of the display.

25 Claims, 3 Drawing Sheets

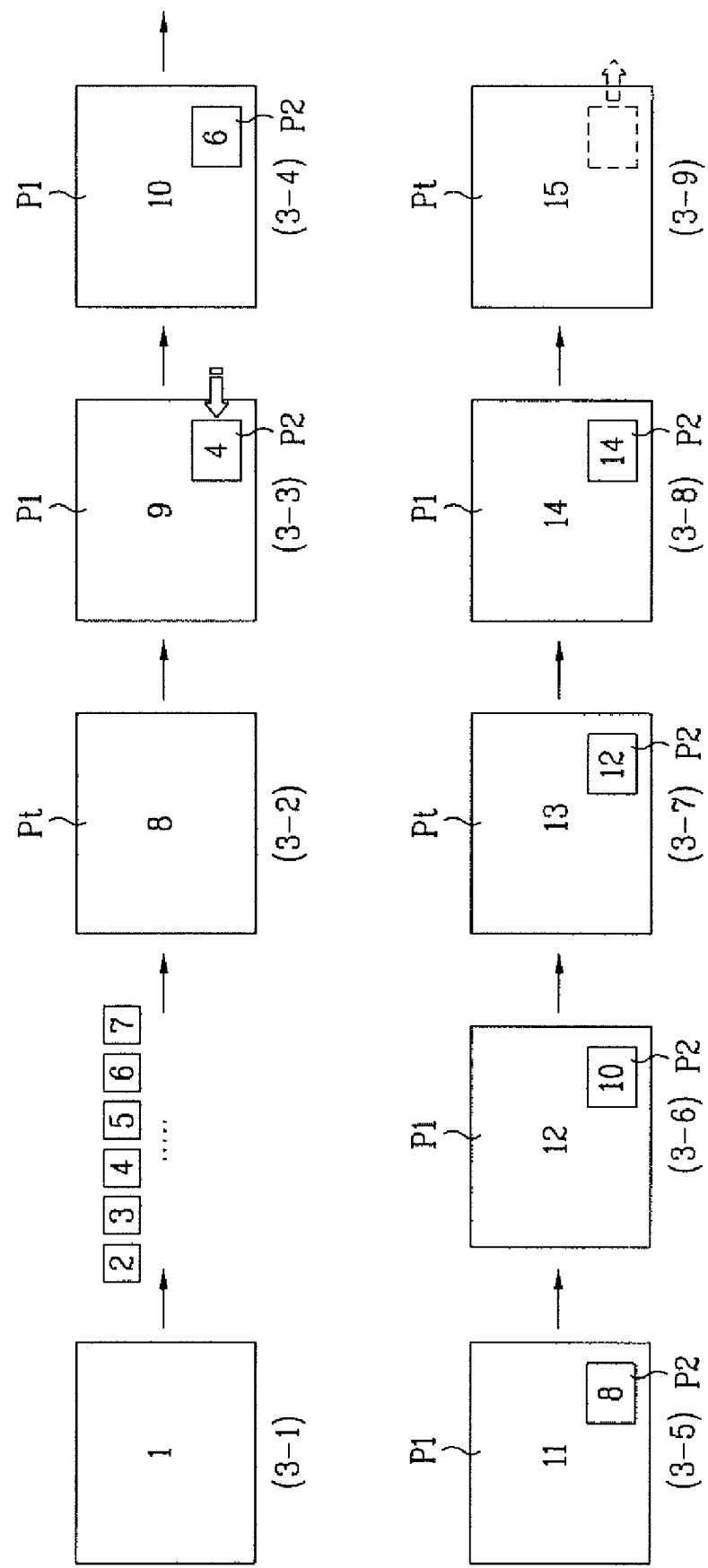

SIMULTANEOUSLY REPRODUCING BROADCAST AND REPLAY CONTENT ON A DISPLAY

CROSS-REFERENCE TO RELATED APPLICATIONS

Pursuant to 35 U.S.C. §119(a), this application claims the benefit of earlier filing date and right of priority to Korean Application No. 10-2006-0105465, filed on Oct. 30, 2006, the contents of which are hereby incorporated by reference herein in their entirety

BACKGROUND OF THE INVENTION

1. Field of the Invention

The present invention relates to broadcast communications, and more particularly to broadcast receiving terminals configured to receive and reproduce such communications.

2. Discussion of the Related Art

Recent developments in broadcasting and associated technology fields have caused changes in broadcasting environments. Currently available broadcast receiving terminals are capable of receiving content provided by popular technologies including terrestrial digital television (DTV), satellite DTV, terrestrial digital multimedia broadcasting (DMB), satellite DMB, and the like. Users of such terminals have demanded increasingly sophisticated receivers for receiving broadcast content, which includes high quality audio and video.

It is desirable to be able to replay broadcast content on the receiving terminal. For instance, the user may have missed a portion of the broadcast, or the user may desire to view again a particularly interesting portion of the broadcast.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method of reproducing media content includes receiving primary content, displaying at a first display rate the primary content on a first region of a display associated with a media content receiving apparatus, and storing replay content from an identified portion of the primary content for time-shifted display of the primary content. The method also includes displaying the replay content at a second display rate, which is different than the first display rate, on a second region of the display. This displaying of the replay content occurs simultaneously with the displaying of the primary content. Another operation includes terminating the displaying of the replay content upon an occurrence of a timing event. The terminating operation causes the primary content to be displayed at a region which includes both the first region and the second region of the display.

According to one feature, the timing event occurs at a point at which the replay content displayed on the second region is effectively the same as the primary content being displayed on the first region.

According to another feature, the method further includes defining the timing event as a predetermined period of time after which displaying of the replay content has started.

According to yet another feature, the method further includes modifying elapsed time of the displaying of the replay content responsive to user input.

According to still yet another feature, the method further includes adjusting the second display rate responsive to user input.

According to one aspect, the second display rate is greater than the first display rate.

According to another aspect, the method further includes locating the second region as a subset region of the first region to define a picture-in-picture (PIP) display.

According to yet another aspect, the first region is distinct from the second region.

According to still yet another aspect, the method further includes displaying the primary content in effectively real-time.

In one feature, the displaying of the replay content occurs responsive to user input.

In another feature, the storing of the replay content includes defining the identified portion of the primary content responsive to a user specifying beginning and ending points of the primary content desired for the time-shifted display.

In yet another feature, the primary content comprises broadcast content.

In still yet another feature, the method further includes automatically terminating the displaying of the replay content.

In one aspect, the timing event occurs at a point at which the replay content displayed on the second region is perceptually similar as the primary content being displayed on the first region.

In accordance with an alternative embodiment, a media reproducing apparatus includes a receiving unit for receiving primary content, memory for storing replay content from an identified portion of the primary content for time-shifted display of the primary content, and a control unit. The control unit is configured to cause a display to display at a first display rate the primary content on a first region of a display, and further cause the display to display the replay content at a second display rate, which is different than the first display rate, on a second region of the display. The replay content is displayed simultaneously with the primary content. The control unit is further configured to terminate the display of the replay content upon an occurrence of a timing event. The terminating operation causing the primary content to be displayed on both the first region and the second region of the display.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments. In the drawings:

FIG. 3 is a block diagram showing possible picture content transitions on a display unit of a media reproducing apparatus.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or similar parts.

By way of example only, the various methods and techniques illustrated in FIGS. 2 and 3 will be described with regard to the apparatus depicted in FIG. 1. However, it is to be understood that embodiments of the present invention are not so limited and may alternatively be implemented using other devices or systems.

Figure 1:
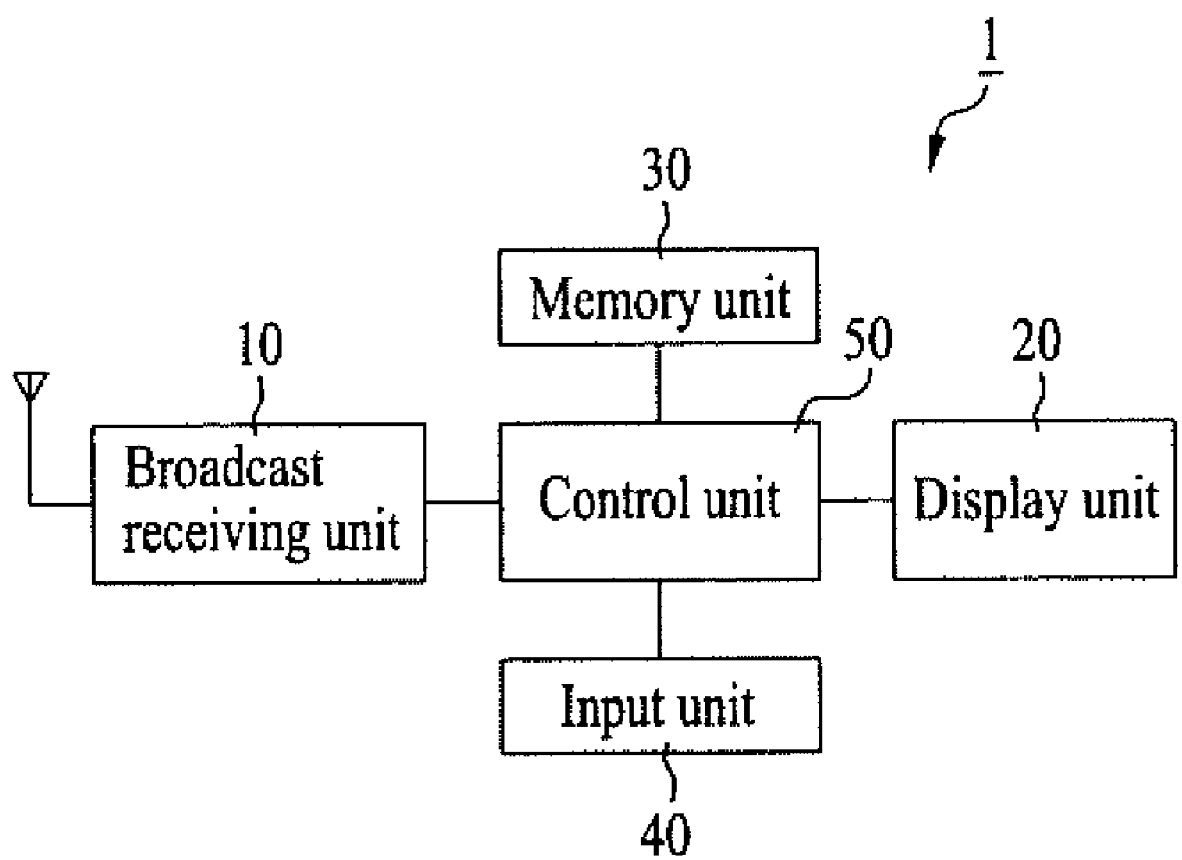
FIG. 1 is a block diagram of a media reproducing apparatus according to an embodiment of the present invention.

FIG. 1 is a block diagram showing various components of a typical broadcast receiving terminal according to an embodiment of the present invention. In this figure, broadcast receiving terminal 1 includes broadcast receiving unit 10, display unit 20, memory unit 30, input unit 40, and control unit 50. Terminal 1 further includes other components for operation, but such components are not required for understanding the present invention and thus have been omitted for clarity.

Broadcast receiving unit 10 may be configured to receive media content broadcast from an available source. Examples of such sources include terrestrial DTV, satellite DTV, terrestrial digital multimedia broadcasting (DMB), satellite DMB, DVB-H which is common in Europe, and the like. In addition, a specific example of a mobile broadcasting system available in the United States is known as MediaFlo.

Display unit 20 is configured to reproduce broadcast content received by broadcast receiving unit 10, thus enabling a user to view the broadcast. The display unit, which is controlled by control unit 50, is configured to reproduce the broadcast content at one, two, or more regions. These regions may be arranged to provide a split screen (e.g., side-by-side, top and bottom, etc.), or as a picture-in-picture PIP display. These features will be described in more detail in conjunction with later figures. If desired, display unit 20 may alternatively be configured to provide desired broadcast content received from the broadcast receiving unit, thus eliminating any need for control unit 50.

Memory unit 30 it typically implemented to store various types of data necessary to support operation of terminal 1. In particular, the memory unit may include software or other instructions, and may also store received broadcast content provided by broadcast receiving unit 10. The memory unit may receive and store the received broadcast content via control unit 50, or in a more direct manner from broadcast receiving unit 10.

Input unit 40 may be implemented using a device which allows a user to interact with terminal 1. Examples of suitable input units include keypads, navigational keys, input keys, touchpads, buttons, jog dial, shuttle dial, and the like.

Control unit 50 is a device which controls various components of terminal 1, including broadcast receiving unit 10, display unit 20, memory unit 30, and input unit 40. In an embodiment, control unit 50 may cause display unit 20 to display at a first display rate primary broadcast content on a first region of a display, and to display replay content at a second display rate (which is different than the first display rate), on a second region of the display.

Typically, the replay content is displayed simultaneously, or substantially simultaneously, as the primary content. The control unit may terminate the displaying of the replay content upon an occurrence of a timing event. This termination function may cause the primary content to be displayed on both the first and second regions. The displaying of replay content will also be referred to a "time-shifted" reproduction of broadcast content.

Terminal 1 may be implemented using a device capable of receiving broadcast content. Suitable devices for the terminal may include a mobile terminal, user equipment, mobile phones, personal digital assistants (PDAs), personal computers, portable computers, monitors, and televisions, among others.

Methods for reproducing broadcast media content according to an embodiment of the present invention will be described with regard to FIGS. 2 and 3. In particular, FIG. 2 is a flowchart depicting a method for reproducing broadcast media content, and FIG. 3 depicts exemplary picture transitions which may occur on a display of a typical broadcast receiving terminal.

Figure 2:
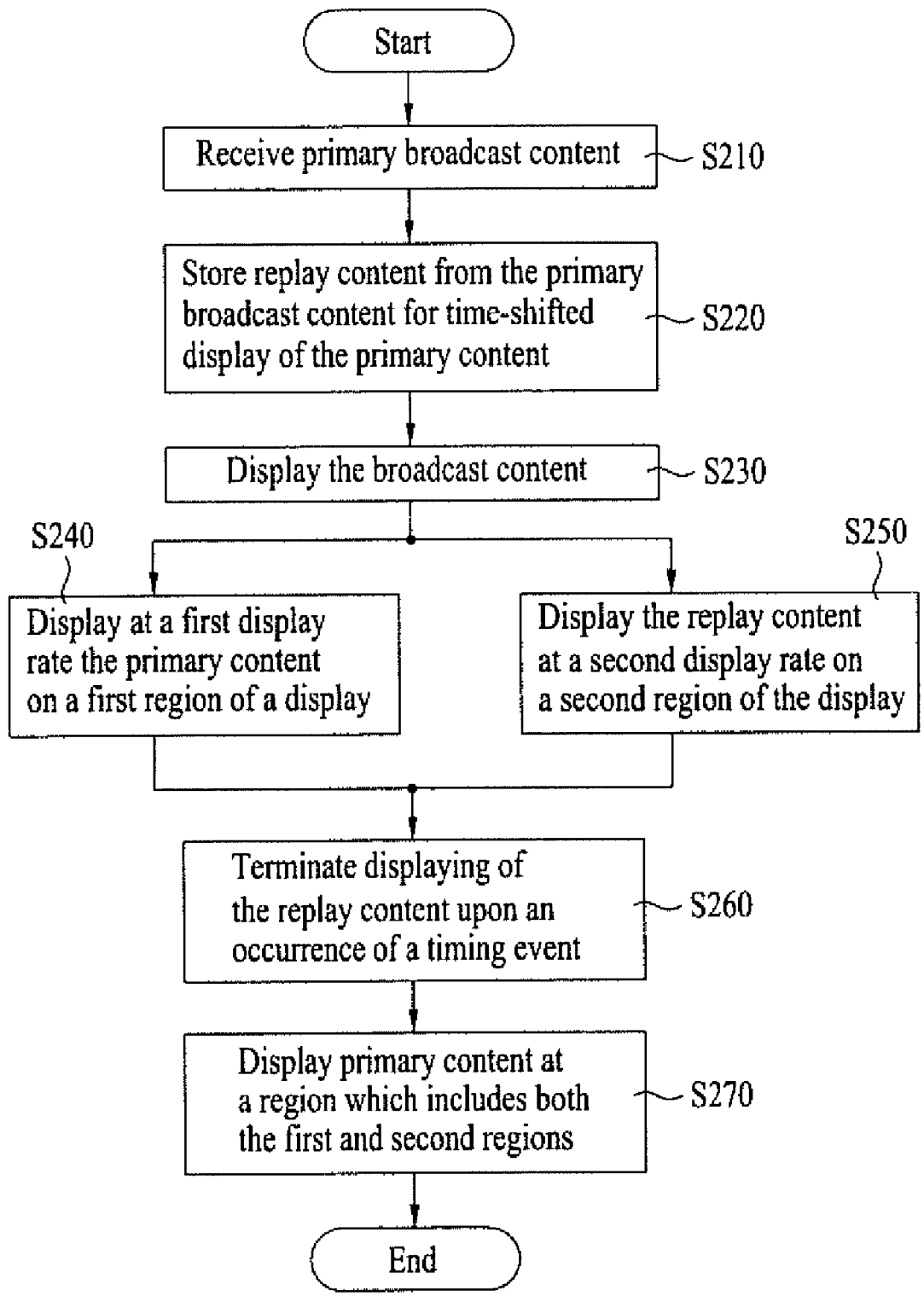
FIG. 2 is a flowchart depicting a method of reproducing media content according to an embodiment of the present invention.

Referring first to the flowchart of FIG. 2, one operation includes receiving primary broadcast content (block S210). At block S220, replay content from an identified or other portion of the primary content is stored for time-shifted display of the primary content.

The storage of the received broadcast content may be accomplished automatically or responsive to user request via, for example, input unit 40. It is possible that the received broadcast content will exceed the storage capabilities of terminal 1. In such a scenario, a first-in-first-out (FIFO) scheme may be implemented such that older portions of the received content are deleted or overwritten to free-up storage space for newly received content.

Displaying broadcast content may occur using, for example, the operations depicted in blocks S230, S240, and S250. In particular, block S240 displays at a first display rate the primary content on a first region of a display which is associated with a media content receiving apparatus. In addition, block S250 displays the replay content at a second display rate, which is different than the first display rate, on a second region of the display. According to an embodiment, displaying of the replay content occurs simultaneously, or substantially simultaneously, with the displaying of the primary content at the first region of the display.

Block S260 terminates displaying of the replay content upon an occurrence of a timing event. This termination operation may be used to cause the displaying of the primary content at a region which includes both the first and second regions of the display. Put another way, the replay content is no longer displayed at the second region and instead the primary content is displayed at a region which includes both the first and second regions (block S270).

Referring now to FIG. 3, at time periods (3-1) and (3-2), broadcast content is received and subsequently displayed on a suitable display screen (e.g., display unit 20). The broadcast content is illustrated as content 1-8. The broadcast content is often displayed in real-time, but this is not a requirement.

At some point, the display screen may be rendered as two or more different regions. For example, at time (3-3), the display screen includes first region P1 and second region P2. The dual-region display may be rendered responsive to user input. In particular, first region P1 continues to display the received broadcast content (content 9), and second region P2 displays replay content (content 4) which is time-shifted relative to the received broadcast content. Put another way, second region P2 is shown displaying content which was previously displayed on first region P1.

If desired, content displayed by these regions may be reversed such that the first region P1 displays the replay content and the second region P2 displays the received broadcast content (e.g., effectively real-time content). As shown, the second region P2 is a subset region of the first region P1 to define a picture-in-picture (PIP) display. These regions may alternatively be arranged side-by-side or top and bottom, for example.

Various operations with regard to displaying the replay content are possible in accordance with embodiments of the present invention. For instance, all of the replay content which has been stored may be displayed on the second region P2. Alternatively, the replay content may be displayed based upon one or more timing points. For instance, an identified portion of the received broadcast content may be displayed responsive to a user specifying a beginning point, or beginning and ending points, of the broadcast content desired for the time-shifted replay content.

Additionally or alternatively, the time-shifted broadcast on second region P2 may be reproduced at a rate which is different (e.g., faster or slower) relative to the rate used to display content on first region P1. This rate may be determined or otherwise modified by the user using, for example, input unit 40 (e.g., jog dial, shuttle dial, etc.). Typically, the reproduction rate of second region P2 is faster than the rate used for first region P1.

Further operation of the example of FIG. 3 will now be described with reference to second region P2 displaying content at a rate which is double the rate used by first region P1. At time 3-4, broadcast content 10 is displayed on first region P1 and broadcast content 6 is displayed on second region P2. Notably, content has advanced one unit (9 to 10) in first region P1, whereas content has advanced two units (4 to 6) in second region P2. At this rate, the content displayed on second region P2 will quickly match that of first region P1. An example of the progression of this scenario is shown in time periods 3-5 through 3-7.

At time period 3-8, content is matched or otherwise synchronized between the two display regions. Specifically, both the first and second regions P1 and P2 display effectively the same content (content 14). This is an example of a timing event which may be used to terminate the use of two separate display regions, such as that shown at time period 3-9. Such termination operation may be used to cause the displaying of the primary content at a region (Pt) which includes both the first and second regions P1, P2 of the display. Put another way, the replay content is no longer displayed at the second region P2 and instead the primary content is displayed over an area which includes the first and second regions. If desired, the transition to a single region (e.g., time period 3-9) may be automatic or responsive to user input.

Various options exist for setting the timing event. A first example is to set the timing event to occur at a point at which the replay content displayed on the second region P2 is effectively the same as (or perceptually similar to) the primary content being displayed on the first region P1 (as described above).

Another example is to define the timing event as a predetermined period of time after which displaying of the replay content has started. Another option is to modify the elapsed time of displaying of the replay content responsive to user input. If desired, either of these options may be used in cooperation with the first example.

If desired, the duration of the displaying of the replay content at second region P2 may be selected by the user. In such an embodiment, the rate at which the replay content is displayed at the second region P2 may be determined based upon a duration parameter and the amount of replay content which is to be displayed at the second region P2.

Various techniques have been described which are useful for replaying portions of received broadcast content, while still viewing the broadcast. For instance, when viewing a soccer game, a previous event may be replayed while still viewing the current game.

If desired, indicators relating to the broadcast may also be displayed on the display. The indicators may relate to the remaining storage capacity (e.g., in recording time or memory size used or available) of the memory used to store the received broadcast, or relate to length (in time) of the stored broadcast.

Accordingly, the following effects or advantages are possible. First, by dividing a screen of a media reproducing apparatus into first and second regions, replay broadcast content (e.g., time-shifted broadcast) may be viewed on the second region while a real-time received broadcast is simultaneously viewed on the first region. Secondly, detailed or quick review of replay content is possible by adjusting the reproduction rate of the time-shifted broadcast on the second region. Thirdly, upon the occurrence of a specific timing point (or event), the first and second regions may be automatically unified into a single region such that only the received broadcast is displayed.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method of reproducing media content, said method comprising:
    receiving primary content;
    displaying said primary content at a first display rate on a first region of a display unit of a media content receiving apparatus;
    storing a portion of said primary content selected by a user as replay content;
    automatically displaying said replay content on a second region of said display unit at a constant second display rate in response to said user input display said replay content,
    wherein said replay content is simultaneously displayed with said primary content; and
    terminating said displaying of said replay content upon an occurrence of a timing event, such that said primary content is displayed at a region which includes said first region and said second region of said display unit,
    wherein said second display rate is determined according to a user-selected duration for displaying said replay content and a duration of said replay content,
    wherein said second display rate is greater than said first display rate when said user-selected duration is less than said duration of said replay content, and
    wherein said second display rate is less than said first display rate when said user-selected duration is greater than said duration of said replay content.

2. The method according to claim 1, wherein said timing event is a point at which said displayed replay content is effectively the same as said displayed primary content.

3. The method according to claim 1, further comprising:
defining said timing event as a predetermined period of time after which displaying of said replay content has started.

4. The method according to claim 2, further comprising:
modifying an elapsed time for displaying said replay content according to a user input.

5. The method according to claim 1, further comprising:
adjusting said second display rate according to a user input.

6. The method according to claim 1, wherein said second display rate is twice that of said first display rate.

7. The method according to claim 1, further comprising:
defining said second region as a subset region of said first region to define a picture-in-picture (PIP) display.

8. The method according to claim 1, wherein said first region is distinct from said second region.

9. The method according to claim 1, further comprising:
displaying said primary content in effectively real-time.

10. The method according to claim 1, wherein said storing of said replay content comprises:
defining said identified portion of said primary content responsive to a user specifying a beginning point and an ending point of said primary content.

11. The method according to claim 1, wherein said primary content comprises broadcast content.

12. The method according to claim 1, further comprising:
automatically terminating said displaying of said replay content.

13. The method according to claim 1, wherein said timing event is a point at which said displayed replay content is perceptually similar as said displayed primary content.

14. A media reproducing apparatus, comprising:
an input unit configured to receive input from a user;
a receiving unit configured to receive primary content;
a display unit configured to display said primary content;
a memory unit configured to store replay content selected from a portion of said primary content by a user via said input unit; and
a control unit configured to:
control said display unit to display said primary content at a first display rate on a first region of said display unit;
control said display unit to automatically display said replay content on a second region of said display unit at a constant second display rate in response to receiving a user input via said input unit,
wherein said replay content is simultaneously displayed with said primary content; and
control said display unit to terminate displaying said replay content upon an occurrence of a timing event, such that said primary content is displayed at a region which includes said first region and said second region of said display unit,
wherein said second display rate is determined according to a user-selected duration for displaying said replay content and an amount of replay content which is to be displayed,
wherein said second display rate is greater than said first display rate when said user-selected duration is less than said duration of said replay content, and
wherein said second display rate is less than said first display rate when said user-selected duration is greater than said duration of said replay content.

15. The apparatus according to claim 14, wherein said apparatus comprises a mobile terminal.

16. The apparatus according to claim 14, further comprising:
an interface for coupling said display unit to said control unit.

17. The apparatus according to claim 14, wherein said timing event is a point when said displayed replay content is effectively the same as said displayed primary content.

18. The apparatus according to claim 17, wherein said second display rate is twice that of said first display rate.

19. The apparatus according to claim 14, wherein said control unit is further configured to:
define said timing event as a predetermined period of time after which displaying of said replay content has started.

20. The apparatus according to claim 14, wherein said control unit is further configured to:
modify an elapsed time of displaying said replay content in response to a user input.

21. The apparatus according to claim 14, wherein said control unit is further configured to:
define said second region as a subset region of said first region to define a picture-in-picture (PIP) display.

22. The apparatus according to claim 14, wherein said first region is distinct from said second region.

23. The apparatus according to claim 14, wherein said primary content comprises effectively real-time content.

24. The apparatus according to claim 14, wherein said primary content comprises broadcast content.

25. The apparatus according to claim 14, wherein said control unit is further configured to:
automatically terminate displaying of said displayed replay content.

* * * * *